United States Patent [19]
Yasuda et al.

[11] 3,725,813
[45] Apr. 3, 1973

[54] GAS LASER TUBE WITH A DISCHARGE PATH DEFINED BY ROD-SHAPED MEMBERS MADE OF ION BOMBARDMENT RESISTIVE INSULATOR MATERIAL

[75] Inventors: Susumu Yasuda; Norio Sato, both of Tokyo, Japan

[73] Assignee: Nippon Electric Company, Limited, Tokyo, Japan

[22] Filed: June 21, 1971

[21] Appl. No.: 154,894

[30] Foreign Application Priority Data

June 25, 1970 Japan..................................45/55717

[52] U.S. Cl....................331/94.5, 315/3.5, 313/220
[51] Int. Cl. .........................H01s 3/02, H01s 3/22
[58] Field of Search ........331/94.5; 330/4.3; 313/220

[56] References Cited

UNITED STATES PATENTS

| 3,211,945 | 10/1965 | Thon......................................315/3.5 |
| 3,293,478 | 12/1966 | Winkler..................................315/3.5 |
| 3,404,349 | 10/1968 | Rigrod....................................331/94.5 |
| 3,562,662 | 2/1971 | Gould et al..........................331/94.5 |

*Primary Examiner*—Ronald L. Wibert
*Attorney*—Sandoe, Hopgood & Calimafde

[57] ABSTRACT

A gas laser tube comprising a discharge path defined by a plurality of rod-shaped members made of an insulator material that is capable of withstanding ion bombardment. The rod-shaped members are preferably circular or hexagonal in cross-section, and are in tight contact with one another and with the inside surface of the tubular portion of the laser tube envelope.

6 Claims, 3 Drawing Figures

INVENTORS
SUSUMU YASUDA
NORIO SATO
BY
Sandoe, Hopgood & Calimafde
ATTORNEYS

GAS LASER TUBE WITH A DISCHARGE PATH DEFINED BY ROD-SHAPED MEMBERS MADE OF ION BOMBARDMENT RESISTIVE INSULATOR MATERIAL

The present invention relates generally to gas laser tubes, and more particularly to an improved structure of a discharge path in a gas laser tube.

The discharge path in conventional gas laser tubes is formed of a glass tube. During the operation of the tube, the inside surface of that glass tube is subjected to bombardment by the accelerated ions or similar charged particles of the plasma produced in the discharge path. This bombardment yields undesired gas and causes the glass tube to undergo erosion as a result of sputtering. The undesired gas adversely affects the life of the cathode of the laser tube, with the result that the gas laser tube has a very short life. The result of ion bombardment may be evidenced by the brownish contamination seen on the tube wall of a gas laser tube that has been operated for a long period of time.

In order to make the tube wall better withstand the ion bombardment, use has been made of quartz as the material for making the tubular portion of the envelope which defines the discharge path. Quartz, however, is considerably permeable to smaller molecular weight gas and shortens the life of a gas laser tube wherein helium containing gas is used as the laser-active material.

Recently, gas laser tubes have been required having the capability of generating stable $TEM_{00}$ mode oscillation with excellent efficiency. In a gas laser tube having this capability, the discharge path must be defined by a tube having a precise small inner diameter and excellent linear uniformity. For example, for a helium-neon gas laser tube having a resonator about 50 cm long, the diameter of the tube, although dependent on the combination of the mirrors, should be $1.8 \pm 0.02$ mm, and its straightness should be $\pm 0.01$ mm. Glass tubes with this precision and linearity require highly developed techniques, and accordingly are expensive. To design quartz tubes capable of withstanding ion bombardment is practically impossible.

Ceramics are resistive to ion bombardment and are only slightly permeable to gases and are, therefore, desirable for use in laser tubes as far as these properties are concerned. It is, however, very difficult to manufacture ceramic tubes having the above-mentioned precision and straightness, and as a result, ceramics have not been widely employed in laser tubes.

It is, therefore, an object of this invention to provide a gas laser tube wherein the discharge path defining tube has an inside surface of a material resistive to ion bombardment.

It is a further object of the invention to provide a gas laser tube in which the tube defining the discharge path has an optical equivalent inside diameter of high precision and excellent straightness.

It is another object of the invention to provide a gas laser tube of the type described which is easy and relatively inexpensive to manufacture.

It is still another object of the invention to provide a gas laser tube of the type described which has a long life and yet is low priced.

It is yet another object of the invention to provide a gas laser tube of the type described which is adapted to mass production.

According to this invention, a gas laser tube having a discharge path and a substantially airtight envelope enclosing that path, comprises a plurality of rod-shaped members arranged within the envelope to define the discharge path. The rod-shaped members are made of electrically insulating material of the type capable of withstanding ion bombardment.

The principle of this invention is to improve the precision and straightness of the discharge space by substituting precise shaping of the outside surface portions for precise shaping of the inside surface portions. The envelope may be made of glass, the rod-shaped members may be made of quartz, alumina, or ceramics into circular or hexagonal cylinders having a precise diameter and excellent straightness by means of a centerless grinder or the like. Preferably, the cylinders for a set of gas laser tubes should be of an identical shape. In order to define the discharge path, the rod-shaped members are brought into tight contact with one another. This may be achieved by placing the cylinders arranged in the desired configuration into a fitting glass tube, which is subsequently hot-pressed.

To the accomplishment of the above and to such further object as may hereinafter appear, the present invention relates to a gas laser tube with a discharge path defined by rod-shaped members made of ion bombardment resistive insulator material substantially as defined in the appended claims and as described in the following specification taken together with the accompanying drawing in which:

Figure 1:
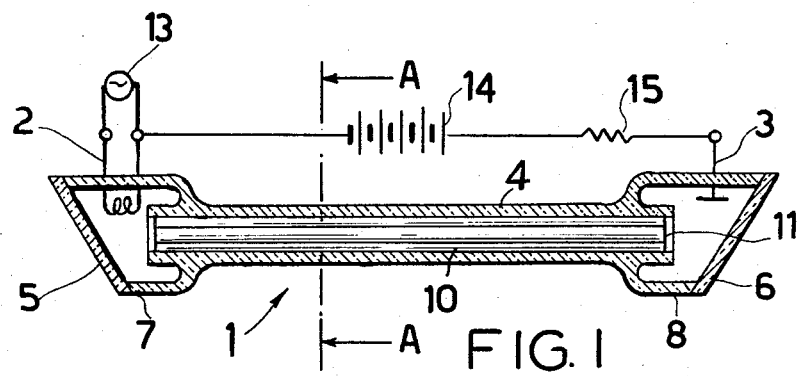
FIG. 1 is a longitudinal sectional view of a gas laser tube according to one embodiment of this invention.
Figure 2:
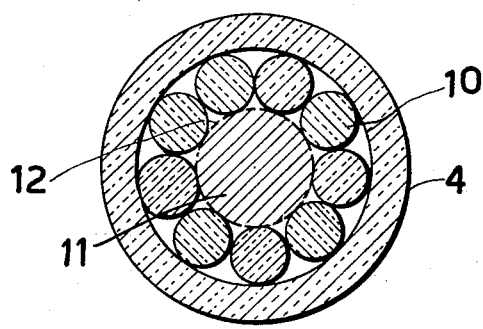
FIG. 2 is an enlarged cross-sectional view of the invention during manufacture, taken along line A — A of FIG. 1.

Referring to FIGS. 1 and 2, a gas laser tube generally designated 1 comprises a cathode 2 and an anode 3 for causing a discharge through a glass tube 4 of small inner diameter. Tube 4 forms an envelope along with Brewster angle windows 5 and 6. Flaring end portions 7 and 8 airtightly seal tube 4 and windows 5 and 6. According to this invention, a plurality of circular rods 10 are arranged within glass tube 4 in tight contact with one another to define a discharge path 11 and with the inside surface of glass tube 4. Rods 10 are preferably made of quartz, but may also be made of alumina. Rods 10 are fabricated with precise diameter and excellent straightness by means of a centerless grinder. The arrangement of rods 10 is accomplished by placing the rods into contact with one another and with a rod 12 (FIG. 2) of tungsten or the like of the desired diameter, inserting the assembly into a fitting glass tube, heating the entire assembly to the softening temperature of the glass tube, squeezing the glass tube through a die, and then removing the tungsten rod 12.

In operation, electric power is supplied to cathode 2 by an a.c. source 13 and across the laser tube by a d.c. high voltage source 14 applied through a ballast resistor 15 to anode 3. The envelope including glass tube 4 is substantially impermeable to gas, even helium. Most of the ions produced within the high density portion of the plasma bombard the surface portions of the quartz rods 10 that inwardly face the discharge path 11.

The glass tube 4 is thus protected against ion bombardment.

The inner diameter of the fitting glass tube which later becomes the glass tube 4 may not be as small as is required for generating the stable and efficient $TEM_{00}$ mode oscillation. It is, therefore, easy to reshape a glass tube into a fitting glass tube having an inner diameter precise enough and whose straightness is sufficiently excellent to make the assembly of the quartz rods 10 and the tungsten or rod 12 fit snugly in along the whole length of the tube.

This invention thus provides in a gas laser tube the straightest possible discharge path having a small, optically equivalent diameter given precisely by the diameter of the removed tungsten rod 12 used in the fabrication of the tube. Thus, by the present invention it is easy to manufacture a fitting glass tube whose inner diameter is $4 \pm 0.01$ mm and a plurality of quartz rods 10 whose diameter is $1.1 \pm 0.005$ mm, and to form by these components a discharge path about 50 cm long and which is $1.8 \pm 0.015$ mm in the equivalent diameter.

Figure 3:
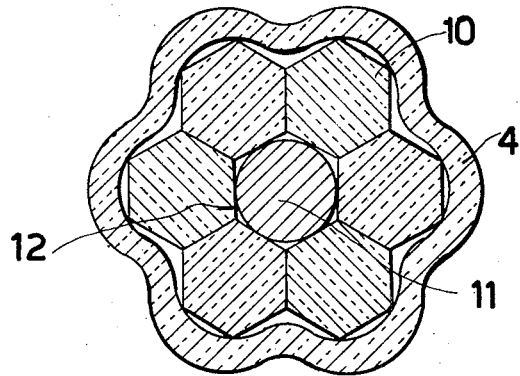
FIG. 3 is a cross-sectional view similar to FIG. 2 of another embodiment of this invention.

Referring to FIG. 3, which illustrates another embodiment of this invention six hexagonal quartz rods 10a are used in place of the cylindrical rods of the previously described embodiment. Hexagonal rods 10a are precisely shaped such as by a grinding process and are tightly held in place by the hot-deformed glass tube 4.

The rod-shaped members of the laser tube of the invention may be made of ceramics rather then quartz as herein specifically described. Furthermore, a set of the rod-shaped members may not be in direct contact with the glass tube 4, but may be held in place by a shrinkage-fitted metal tube and placed inside the glass tube 4.

Thus, while the invention has been specifically described with reference to several embodiments thereof, it will be apparent that modifications may be made therein all without departing from the spirit and scope of the invention.

What is claimed is:

1. A gas laser tube comprising a substantially airtight envelope for containing a laser gas, means within said envelope for producing a discharge in said gas along an axial path therein said discharge containing charged particles, and a plurality of solid rod-shaped members arranged within said envelope in contact with one another substantially along their entire lengths and defining said axial path, said discharge path being completely surrounded by said plurality of rod-shaped members being made of electrically insulating material capable of withstanding the bombardment effected by the charged particles produced in said path.

2. The gas laser tube as claimed in claim 1, in which said envelope is made of glass, and said rod-shaped members are made of quartz.

3. The gas laser tube as claimed in claim 2, in which said rod-shaped members are circular in cross section, said members being in tight contact with the inside surface of said envelope.

4. A gas laser tube as claimed in claim 1, in which said envelope is made of glass, and said rod-shaped members are made of alumina.

5. The gas laser tube as claimed in claim 4, wherein said rod-shaped members are hexagonal in cross section, the number of such members being six, each of said members being in tight contact with the adjacent rod-shaped member at one side face of the hexagonal cylinder and with the inside surface of said envelope, said six members forming a hollow hexagonal cylinder-shaped discharge path.

6. The gas laser tube as claimed in claim 1, in which said rod-shaped members are hexagonal in cross section, said members being in tight contact with one side face of adjacent ones of said members and with the inside surface of said envelope.

* * * * *